United States Patent [19]

Hambleton, Jr. et al.

[11] Patent Number: 5,684,283
[45] Date of Patent: Nov. 4, 1997

[54] RUPTURABLE STRAIN RELIEVING HORN SWITCH BRIDGING MEMBER

[75] Inventors: Howard W. Hambleton, Jr., South Ogden; Kevin W. Booth, Riverdale; Merle K. Ricks, Layton; Janiel Sorenson, Salt Lake City, all of Utah

[73] Assignee: Morton International, Inc., Chicago, Ill.

[21] Appl. No.: 590,501

[22] Filed: Jan. 24, 1996

[51] Int. Cl.⁶ .................... H01H 35/00; B60R 21/09; B60R 21/16
[52] U.S. Cl. .................... 200/61.08; 200/61.54; 280/731; 280/735
[58] Field of Search .................... 200/61.08, 61.44, 200/61.54–61.57; 307/10.1; 280/727, 728.1, 728.3, 731, 734, 735

[56] References Cited

U.S. PATENT DOCUMENTS

| | | | |
|---|---|---|---|
| 3,822,369 | 7/1974 | Kunczynski | 200/61.08 |
| 4,369,479 | 1/1983 | Rickard | 200/61.08 |
| 5,198,629 | 3/1993 | Hayashi et al. | 200/61.54 |
| 5,265,904 | 11/1993 | Shelton et al. | 280/731 |
| 5,449,197 | 9/1995 | Kerner | 280/731 |
| 5,465,998 | 11/1995 | Davis | 280/731 |
| 5,577,767 | 11/1996 | Nemoto | 280/731 |
| 5,585,606 | 12/1996 | Ricks | 200/61.08 |
| 5,590,902 | 1/1997 | Eckhout | 280/728.3 |

*Primary Examiner*—J. R. Scott
*Attorney, Agent, or Firm*—George W. Rauchfuss, Jr.; Gerald K. White

[57] ABSTRACT

A membrane horn switch wherein the two membranes sheets of the horn switch have first and second relatively large areas connected by a rupturable, strain relieving bridge member. The bridge members provide an area that is readily rupturable from a force provided by an inflating airbag cushion such that the bridge members can be appropriately placed over a tear seam of a cover of an airbag module in a motor vehicle. Each bridge member of the horn switch has a non-straight path so as to lessen strain fatigue and prolong the durability of the bridge member.

18 Claims, 5 Drawing Sheets

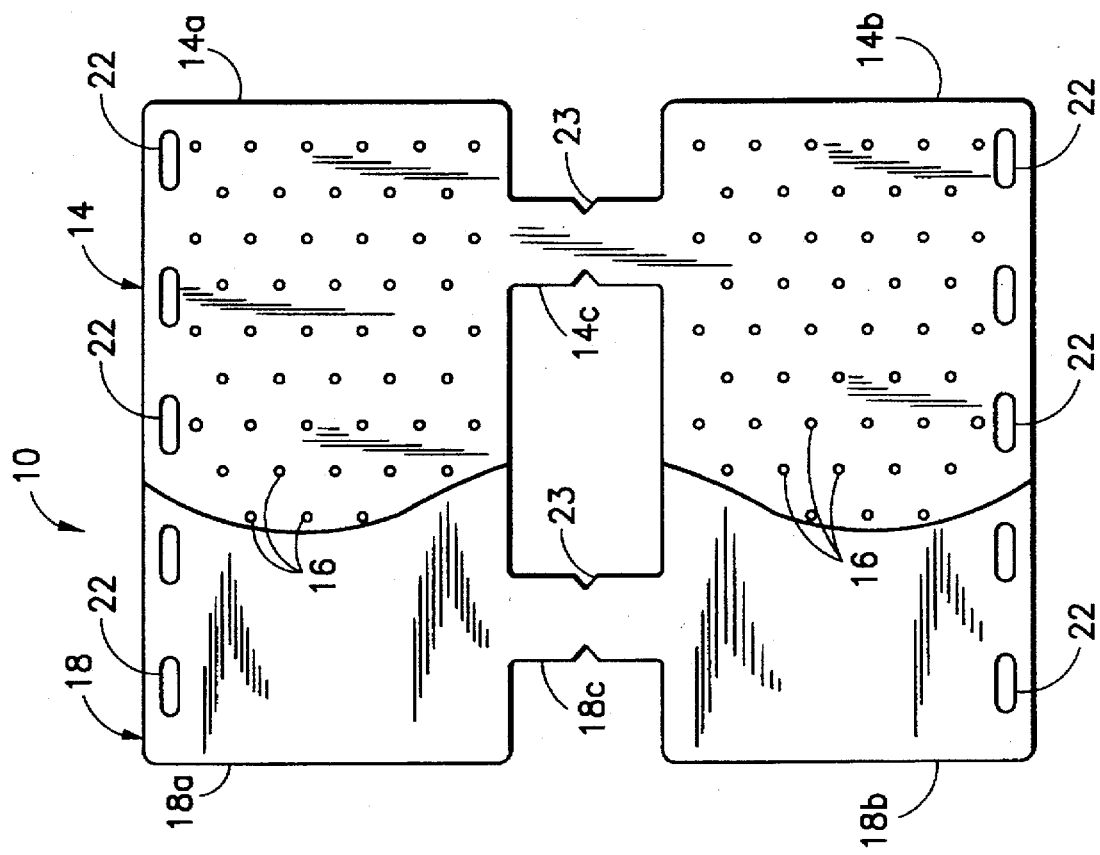

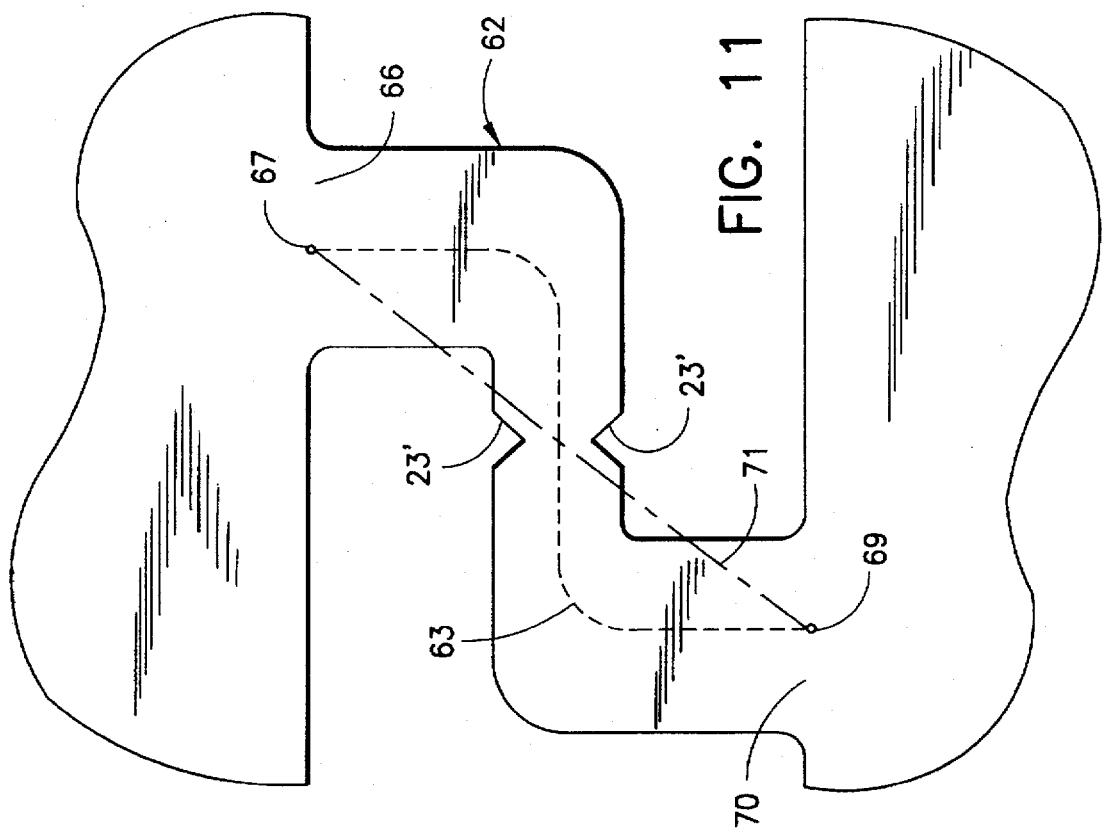
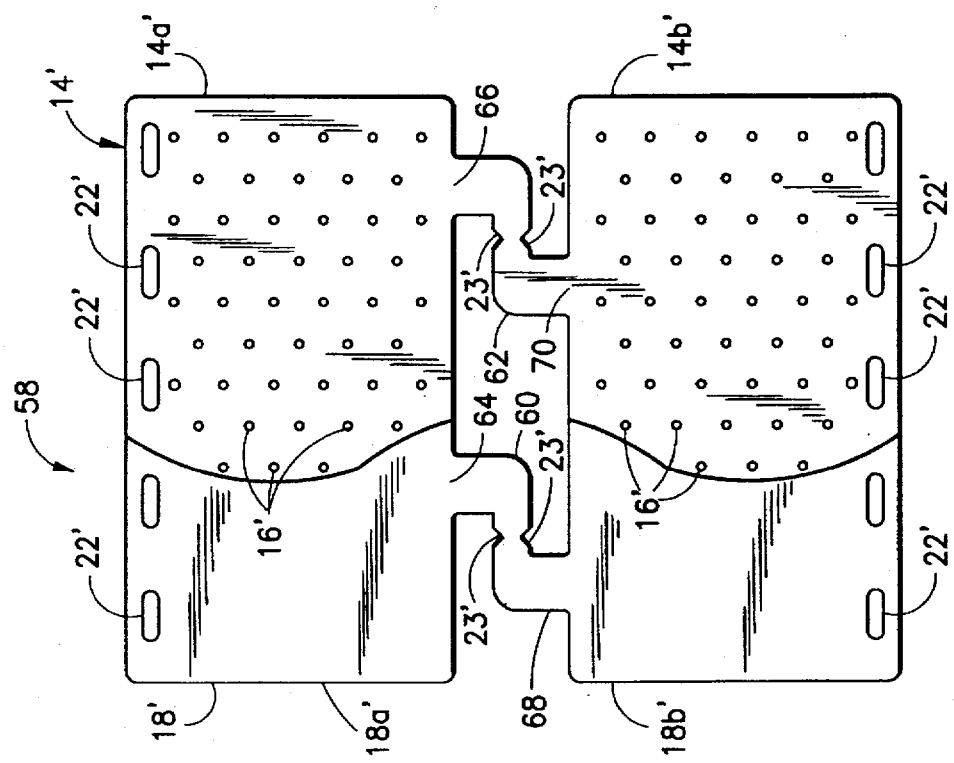

RUPTURABLE STRAIN RELIEVING HORN SWITCH BRIDGING MEMBER

FIELD OF THE INVENTION

The present invention relates to a membrane horn switch for use in a driver side airbag module, and more specifically, the present invention relates to a membrane horn switch having rupturable strain relieving bridge members.

BACKGROUND OF THE INVENTION

This invention relates to a membrane horn switch assembly for a driver side airbag module conventionally mounted on a steering wheel of a motor vehicle. In such an airbag module an airbag cushion is normally forced out of the module in a predetermined manner through weakened areas or tear seams in a horn actuation area of an airbag module cover. The tear seam generally divides the horn actuation area of the cover. In order to accommodate and not interfere with the operation of the tear seams in the airbag module cover during deployment of the airbag cushion, and in order to provide the potential for actuation of the horn switch over a larger area of the cover, one membrane horn switch, shown and described in co-pending application Ser. No. 08/418,831, now U.S. Pat. No. 5,585,606, is provided with bridging areas for spanning the tear seam of the airbag module cover while connecting two larger halves of the horn switch.

A membrane horn switch generally includes two very thin membrane sheets having conductive coatings which are separated by thin spacers or dielectric material. On the '831 horn switch, each of the two membrane sheets are configured so that they each have two relatively large areas that are adapted to be placed behind the horn actuation area of the airbag cover on opposite sides of the tear seam. Each membrane sheet also has at least one relatively small bridging area or member connecting the two relatively large areas and spanning the tear seem. The bridge members are small and readily rupturable as the airbag cushion is deployed. The bridge members also complete the circuit of the horn switch so that only one set of wiring is needed to make essentially the entire airbag module cover sensitive to horn actuation.

Because the tear seam is normally located at or near the center of the horn actuation area of the airbag module cover, and because the bridge members span the tear seam, the bridge members bend and twist upon a driver pressing upon the horn actuation area. Over the average life of an automobile, the bridge members may be subjected to hundreds or thousands of cycles of bending and twisting. It has been discovered that such bending or twisting can cause failure of the bridge members and render the horn switch inoperable. It is important, therefore, that the bridging members be able to withstand thousands of cycles of bending and twisting without failure of the bridge members and the membrane horn switch during the average life of an automobile.

BRIEF SUMMARY OF THE INVENTION

An object, therefore, of the present invention is to provide a membrane horn switch having bridge members able to withstand thousands of cycles of bending and twisting without failure of the bridge members and the membrane horn switch during the average life of an automobile. The present invention meets this object by providing an improved membrane horn switch having rupturable strain relieving bridge members. The horn switch has first and second electrically conductive membrane sheets each having first and second relatively large areas connected by at least one relatively small bridge member. The at least one bridge member of each membrane sheet is readily rupturable by a force provided by an inflating airbag in an airbag module. The first and second relatively large areas of the second membrane sheet are superimposed and coextensive respectively with the first and second relatively large areas of the first membrane sheet, with a dielectric spacer means separating the conductive membrane sheets until sufficient actuation pressure is exerted on the membrane horn switch.

The improvement comprises the at least one bridge member of each conductive membrane sheet having a non-straight path between the first large conductive area and the second large conductive area of each conductive membrane sheet. The non-straight path of the bridge members provides reduced tension across the bridge members and a greater range of movement to reduce the resulting stress on the bridge members during the bending and twisting of horn actuation. The non-straight path of the bridge members, therefore, increases the useful life of the bridge members and in-turn the horn switch.

The invention together with further objects, features, advantages and aspects thereof, will be more clearly understood from the following description taken in connection with the accompanying drawings.

BRIEF DESCRIPTION OF THE DRAWINGS

FIG. 5 is a plan view, partially in section, of the prior art membrane horn switch of FIG. 1;

FIG. 10 is a plan view, partially in section, of an additional membrane horn switch according to the present invention; and FIG. 11 is an enlarged view of a bridge member of the membrane horn switch of FIG. 10.

The same reference numerals refer to the same elements throughout the various figures.

DETAILED DESCRIPTION OF THE INVENTION

Figure 1:
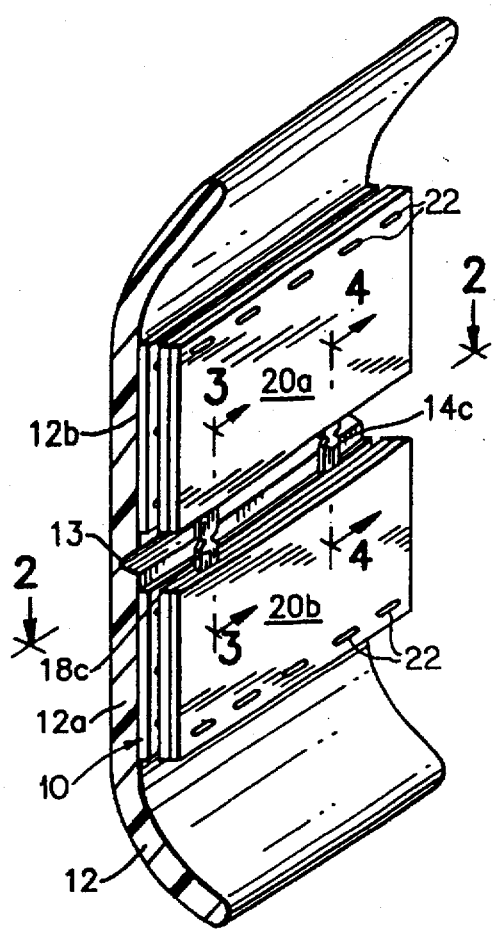
FIG. 1 is a partial perspective view of an airbag cover with a prior art membrane horn switch.
Figure 3:
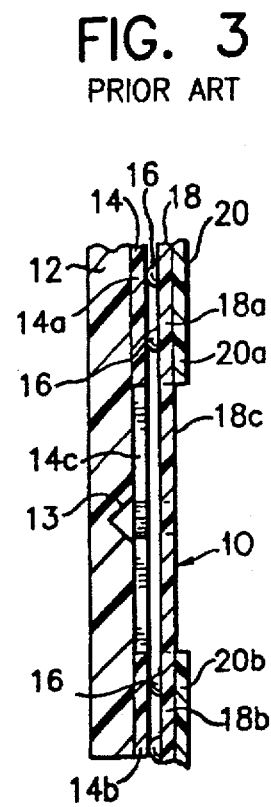
FIG. 3 is an enlarged cross-sectional view of the membrane horn switch along the lines 3—3 of FIG. 1.
Figure 2:
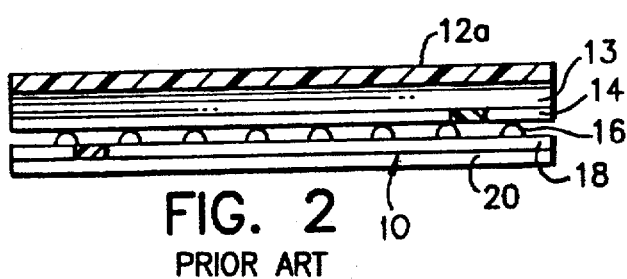
FIG. 2 is a cross-sectional view of the membrane horn switch along the lines 2—2 of FIG. 1.
Figure 4:
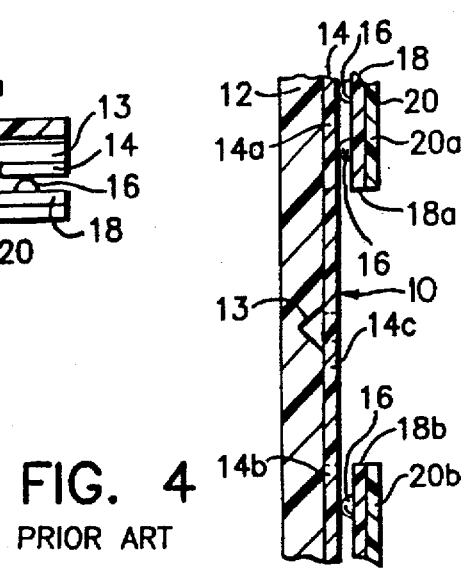
FIG. 4 is an enlarged cross-sectional view of the membrane horn switch along the lines 4—4 of FIG. 1.

A prior art membrane horn switch 10 mounted on a driver side airbag cover of an airbag module is illustrated in FIGS. 1 to 5. The membrane horn switch 10 is mounted on the back or inner side of an airbag module cover or deployment door, hereinafter referred to as a cover 12, comprising first and second cover portions 12a and 12b on opposing sides of a tear line or weakened area 13. Upon deployment of an inflatable airbag cushion (not shown) in the airbag module the force of the inflating airbag ruptures tear line 13 and permits the airbag to deploy. Membrane horn switch 10 is mounted on the rear or inner side of the cover 12 (i.e. on the cover side facing away from the vehicle driver or occupant) by any suitable means such as by heat staking, thermal bonding, cementing or the like.

The membrane horn switch 10 comprises two electrically conductive membrane sheets, namely a first membrane sheet 14 and a second membrane sheet 18. Each membrane sheet 14 and 18 comprises generally a planar, rectangularly-shaped sheet of thin film, generally of polyethylene or polyester such as a MYLAR polyester. An electrically conductive coating coats one side of the sheet of thin film and may be applied by any suitable means, such as for example, by screening conductive ink or copper or silver or aluminum thereon. The membrane sheets 14 and 18 may be of a total thickness of about 0.13 mm for example.

Each membrane sheet 14 and 18 comprises two relatively large electrically conductive areas or halves 14a,14b and 18a,18b connected by at least one relatively small electrically conductive bridge member 14c and 18c. The bridge members 14c and 18c are preferably unitary with the large areas 14a,14b and 18a,18b. The bridge members 14c and 18c are also generally of the same thickness and of the same material as the large areas 14a,14b and 18a,18b, and it will be appreciated that there may be more than one such bridge member between the two halves of each membrane sheet. The relatively small bridge members 14c,18c provide readily rupturable areas for a force produced by an inflating airbag as will be described hereinafter. The relatively small bridge members 14c and 18c may be provided with one or more and preferably at least two opposing notches 23, which act to further weaken the thin membrane bridge members and enhance their ability to rupture during airbag deployment.

The membrane sheets 14 and 18 may be provided with mounting openings 22 along peripheral edges of said sheets for bonding the assembled membrane horn switch 10 to airbag door 12 such as by use of stakes or may be bonded to the door in any suitable manner such as by heat staking, thermal bonding or by ultrasonic welding or the like. Each of membrane sheets 14 and 18 are provided with an electrical wire and terminal (not shown) for coupling the membrane sheet to electrical circuitry utilized to actuate a horn that the horn switch 10 is designed to operate upon actuation of the horn switch.

The two electrically conductive membrane sheets 14 and 18 are assembled into the membrane horn switch 10 by superimposing the two sheets, such that relatively large area 14a of sheet 14 and relatively large area 18a of sheet 18 overlay each other as do relatively large areas 14b and 18b with their conductive coatings facing each other. One or both of membrane sheets 14 and 18 may be provided with a dielectric coating or spacers 16 in a predetermined suitable pattern so that when the relatively large electrically conductive areas 14a and 14b of sheet 14 are superimposed over respective corresponding large areas 18a and 18b of sheet 18, the dielectric spacers 16 prevent closing of the horn switch 10 and completion of the actuation circuit until sufficient actuation pressure is exerted onto the airbag cover 12 to cause the electrically conductive membrane sheets 14 and 18 to contact each other. The thickness and shape of the dielectric spacers 16 can be varied to alter the sensitivity of the horn switch 10.

The bridge members 14c and 18c of the two membrane sheets 14 and 18 are preferably located so that, when the relatively large electrically conductive areas 14a,14b and 18a,18b of each of the two membrane sheets 14 and 18 are superimposed over each other, bridge members 14c and 18c are not superimposed or overlay each other but are instead spaced laterally apart from each other such that they span the tear seam 13 of the cover 12 at different locations when the assembled horn switch 10 is mounted on the rear side of the cover. Of course, it will be appreciated that the bridge members 14c and 18c may, if desired, also be superimposed with a dielectric layer sandwiched between the two bridge members.

Rigid backing plates or sheets 20a and 20b may be employed to the rear of the membrane sheets 14 and 18 to provide for easier actuation of the assembled membrane horn switch 10. The backing members 20a and 20b are preferably a rigid thermoplastic sheet and more particularly a polycarbonate having a thickness of about 1 mm to provide a stable and rigid pressure surface for actuation of the horn switch 10. The backing plates 20a and 20b can be provided with mounting openings 22 corresponding to the mounting openings 22 on membrane sheets 14 and 18.

The assembled membrane horn switch 10, preferably with rigid backing members 20a and 20b, is mounted against the rear or inner surface of the desired horn actuation area of the airbag module cover 12. The large areas 14a and 18a and backing plate 20a are positioned over first cover portion 12a, and the large areas 14b and 18b and backing plate 20b are positioned over second cover portion 12b so that the bridge members 14c and 18c of membrane sheets 14 and 18 are positioned transversely across tear seam 13 of the cover 12. Thus, the membrane horn switch 10 is sandwiched between a thin and flexible deployment door cover 12 and relatively rigid backing plates 20a and 20b with the bridge members 14c and 18c transversing tear line 13 of the door cover. Depression of the airbag module cover 12 by the driver will readily compress membrane horn switch 10 against the rigid backing plates 20a and 20b causing the conductive coatings 25 and 29 on membrane sheets 14 and 18 to contact each other to thereby close the circuit and activate a remote, connected horn (not shown).

Should a situation arise commencing deployment of the airbag, the pressure of the inflating airbag will readily force membrane bridge members 14c and 18c to rupture and the airbag to then rupture tear line 13 of the airbag module cover 12 to cause the cover to open permitting deployment of the airbag. The thinness and smallness of the bridge members 14c and 18c, when aligned with the rupturable tear line 13 of the airbag deployment door 12, allows the bridge members to readily rupture during deployment of the airbag. Moreover, the notches 23 further weaken the bridge members 14c and 18c to enhance their ability to rupture during airbag deployment.

In addition to compressing the membrane horn switch 10, depression of the airbag module cover 12 by the driver will also cause the bridge members 14c and 18c to bend and flex. As shown, the bridge members 14c and 18c form a straight line path between the larger areas of the membrane sheets. The straight line path can place the bridge members 14c and 18c in tension between the two halves when the horn switch 10 is mounted on the cover. This tension can place additional stress on the bridge members 14c and 18c during horn actuation, leading to a reduction in the useful life of the bridge members and the horn switch.

Figure 6:
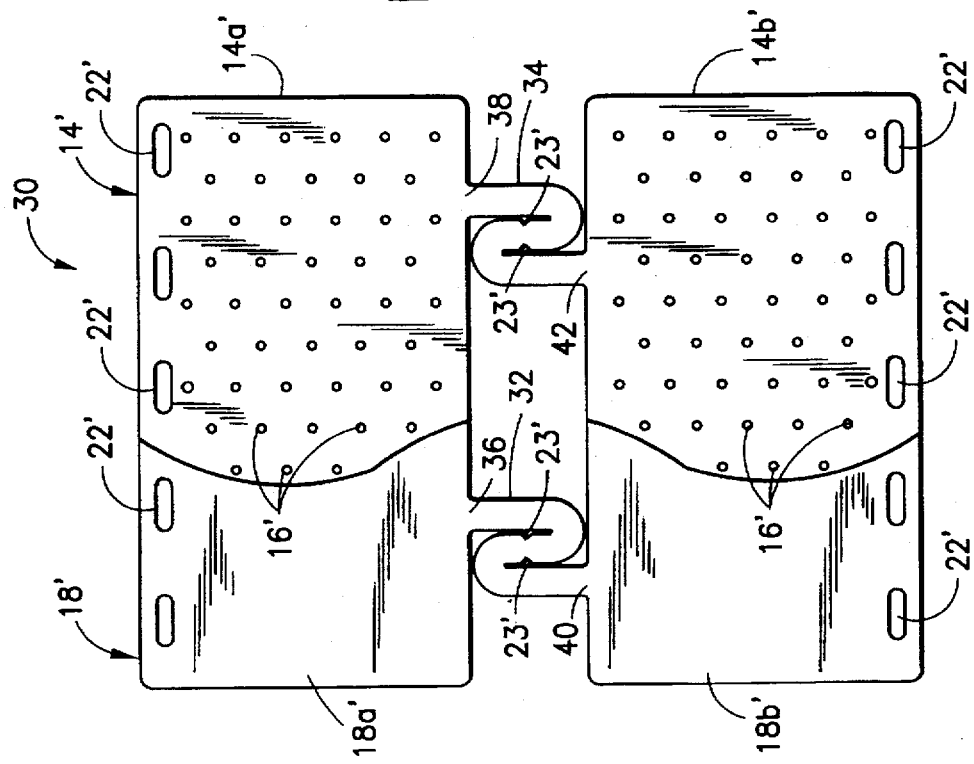
FIG. 6 is a plan view, partially in section, of a membrane horn switch according to the present invention.

Referring to FIG. 6, a membrane horn switch 30 according to the present invention is shown and includes rupturable strain relieving bridge members 32 and 34. The horn switch 30 is similar to the prior art horn switch 10 of FIGS. 1–5, and parts of the horn switch 30 which are the same or perform the same or similar function as the parts of the horn switch 10 of FIGS. 1–5 have the same reference numeral but a prime designation.

A relatively small electrically conductive bridge member 32,34 of each electrically conductive membrane sheet 14', 18' of the horn switch 30 has a first juncture 36,38 with the first large conductive area 14a', 18a' and a second juncture 40,42 with the second large conductive area 14b', 18b'. The bridge members 32 and 34 are generally flat and generally of the same thickness and of the same material as the large areas 14a', 14b' and 18a', 18b', and it will be appreciated that there may be more than one such bridge member between the two large areas of each membrane sheet. The relatively small bridge members 32,34 provide readily rupturable areas for a force produced by an inflating airbag. The bridge members 32 and 34 can also be provided with one or more, and preferably at least two opposing notches 23', which act to further weaken the bridge members and enhance their ability to rupture during airbag deployment.

Figure 7:
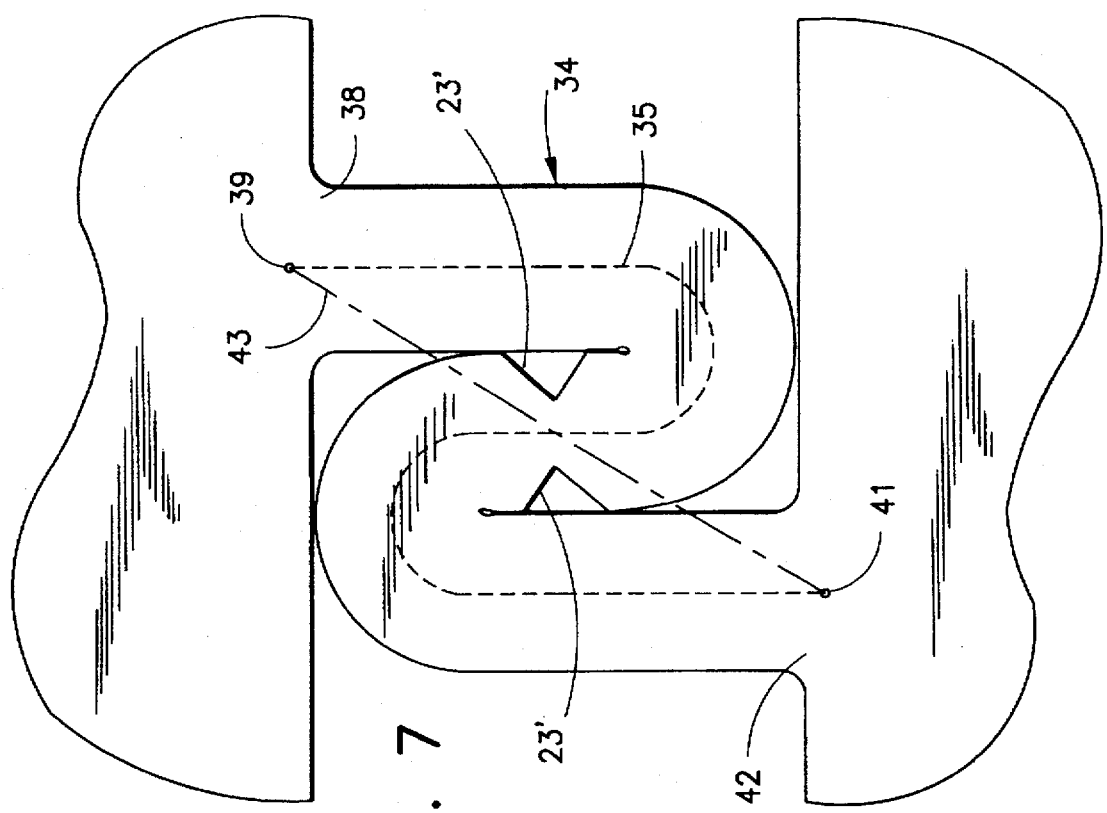
FIG. 7 is an enlarged view of a bridge member of the membrane horn switch of FIG. 6.

In order to reduce stress on the bridge members 32,34, each bridge member has a non-straight path between the first juncture 36,38 and the second juncture 40,42. Specifically, the first juncture 36,38 is offset from the second juncture 40,42 of each bridge member 32,34, and each bridge member has a serpentine path generally in the form of an "S" between the first juncture and the second juncture. As shown in FIG. 7, the bridge member 34 has an overall length 35 between a central point 39 of the first juncture 38 and a central point 41 of the second juncture 42 that is greater than the length of an imaginary straight line 43 between the central point of the first juncture and the central point of the second juncture (this description applies to bridge member 32).

The non-straight path of the bridge members 32,34 allows extra slack and leeway between the large conductive areas of the horn switch 30, thereby reducing tension across the bridge members. The non-straight path also provides a greater freedom of movement to the bridge members 32,34, thereby allowing easier bending and twisting. This reduced tension and greater freedom of movement, in combination, reduces the resulting stress on the bridge members 32,34 during the bending and twisting of horn actuation. The non-straight path of the bridge members 32,34, therefore, increases the useful life of the bridge members and in-turn the life of the horn switch 30.

Figure 8:
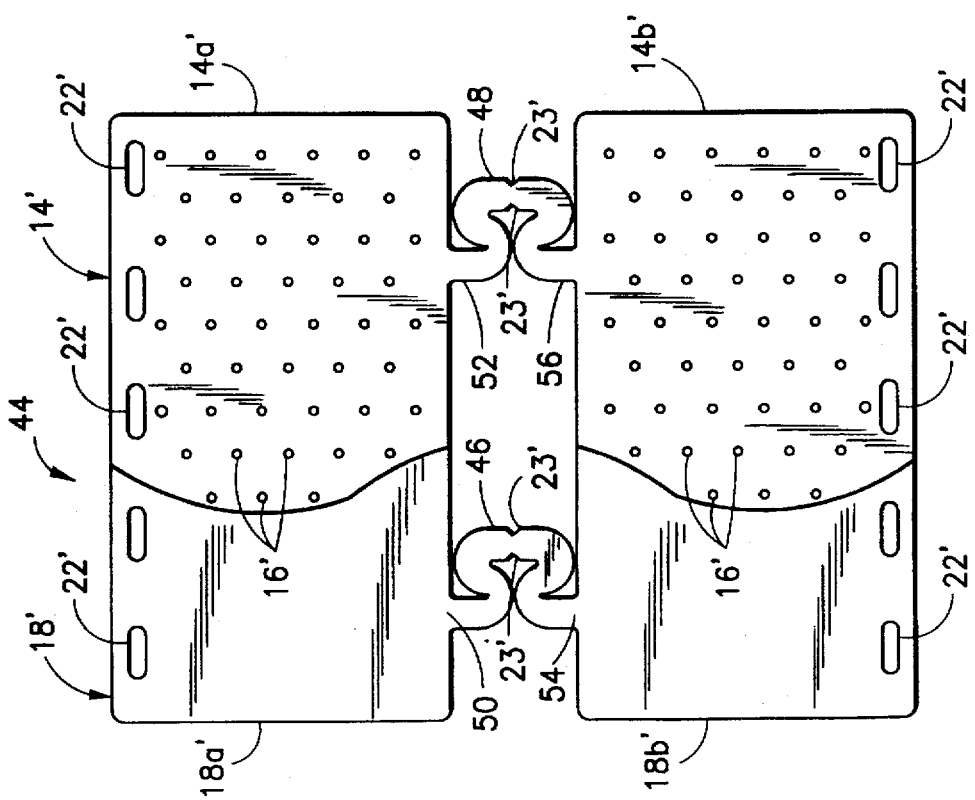
FIG. 8 is a plan view, partially in section, of another membrane horn switch according to the present invention.

Referring to FIG. 8, another membrane horn switch 44 according to the present invention is shown and includes rupturable strain relieving bridge members 46 and 48. The horn switch 44 is similar to the prior art horn switch 10 of FIGS. 1–5, and parts of the horn switch 44 which are the same or perform the same or similar function as the parts of the horn switch 10 of FIGS. 1–5 have the same reference numeral but a prime designation.

A relatively small electrically conductive bridge member 46,48 of each membrane sheet 14', 18' of the horn switch 44 has a first juncture 50,52 with the first large conductive area 14a', 18a' and a second juncture 54,56 with the second large conductive area 14b', 18b'. The bridge members 46 and 48 are generally flat and generally of the same thickness and of the same material as the large areas 14a', 14b' and 18a', 18b', and it will be appreciated that there may be more than one such bridge member between the two large areas of each membrane sheet. The relatively small bridge members 46,48 provide readily rupturable areas for a force produced by an inflating airbag. The bridge members 46 and 48 can also be provided with one or more, and preferably at least two opposing notches 23', which act to further weaken the bridge members and enhance their ability to rupture during airbag deployment.

Figure 9:
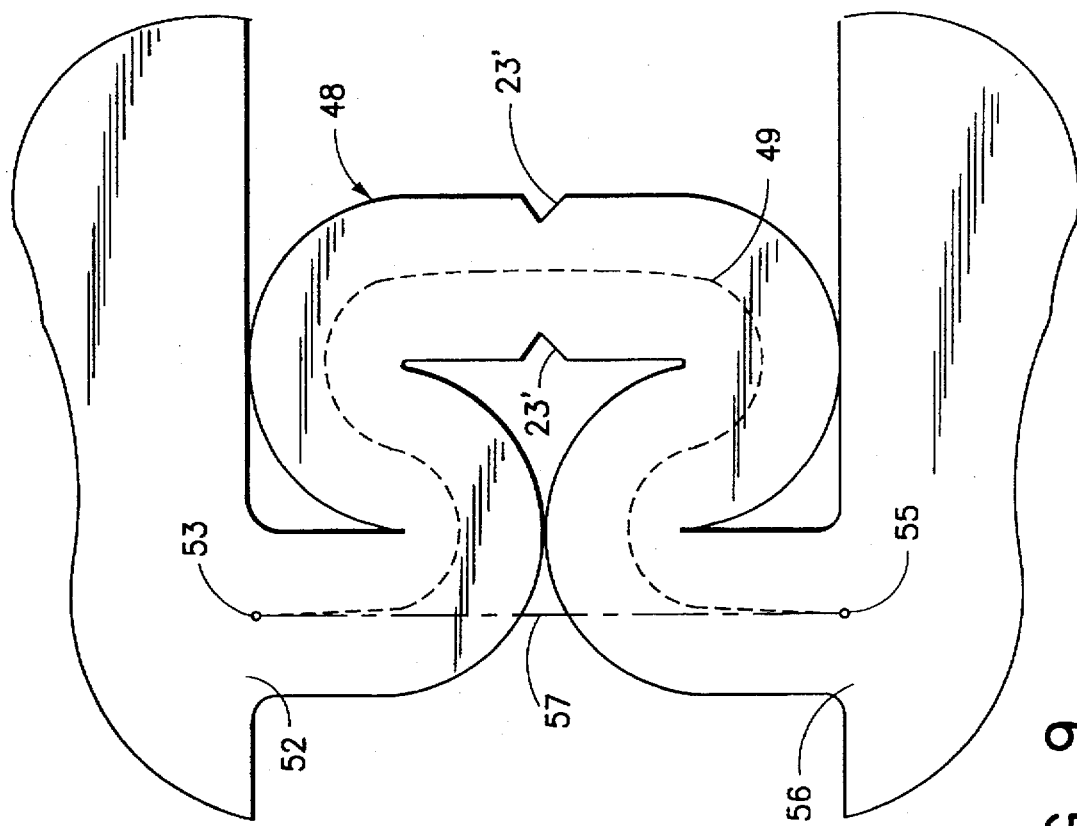
FIG. 9 is an enlarged view of a bridge member of the membrane horn switch of FIG. 8.

In order to reduce stress on the bridge members 46,48, each bridge member has a non-straight path between the first juncture 50,52 and the second juncture 54,56 of each bridge member. Specifically, the first juncture 50,52 is aligned with the second juncture 54,56 of each bridge member 46,48, and each bridge member has a serpentine path generally in the form of an omega between the first juncture and the second juncture. As shown in FIG. 9, the bridge member 48 has an overall length 49 between a central point 53 of the first juncture 52 of the bridge member and a central point 55 of the second juncture 56 of the bridge member that is greater than the length of an imaginary straight line 57 between the central point of the first juncture and the central point of the second juncture (this description applies to bridge member 54).

The non-straight path of the bridge members 46,48 allows extra slack and leeway between the large conductive areas of the horn switch 44, thereby reducing tension across the bridge members. The non-straight path also provides a greater freedom of movement to the bridge members 46,48, thereby allowing easier bending and twisting. This reduced tension and greater freedom of movement, in combination, reduces the resulting stress on the bridge members 46,48 during the bending and twisting of horn actuation and increases the useful life of the bridge members.

Referring to FIG. 10, an additional membrane horn switch 58 according to the present invention is shown and includes rupturable strain relieving bridge members 60 and 62. The horn switch 58 is similar to the prior art horn switch 10 of FIGS. 1–5, and parts of the horn switch 58 which are the same or perform the same or similar function as the parts of the horn switch 10 of FIGS. 1–5 have the same reference numeral but a prime designation.

A relatively small electrically conductive bridge member 60,62 of each membrane sheet 14', 18' of the horn switch 58 has a first juncture 64,66 with the first large conductive area 14a', 18a' and a second juncture 68,70 with the second large conductive area 14b', 18b'. The bridge members 60 and 62 are generally flat and generally of the same thickness and of the same material as the large areas 14a', 14b' and 18a', 18b', and it will be appreciated that there may be more than one such bridge member between the two large areas of each membrane sheet. The relatively small bridge members 60,62 provide readily rupturable areas for a force produced by an inflating airbag. The bridge members 60 and 62 can also be provided with one or more, and preferably at least two opposing notches 23', which act to further weaken the bridge members and enhance their ability to rupture during airbag deployment.

In order to reduce stress on the bridge members 60,62, each bridge member has a non-straight path between the first juncture 64,66 and the second juncture 68,70 of each bridge member. Specifically, the first juncture 64,66 is offset from the second juncture 68,70 of each bridge member 60,62, and each bridge member has a serpentine path generally in the form of a "Z" between the first juncture and the second juncture. As shown in FIG. 11, the bridge member 62 has an overall length 63 between a central point 67 of the first juncture 66 of the bridge member and a central point 69 of the second juncture 70 of the bridge member that is at least greater than the length of an imaginary straight line 71 between the central point of the first juncture and the central point of the second juncture (this description applies to bridge member 60).

The non-straight path of the bridge members 60,62 allows extra slack and leeway between the large conductive areas of the horn switch 58, thereby reducing tension across the bridge members. The non-straight path also provides a greater freedom of movement to the bridge members 60,62, thereby allowing easier bending and twisting. This reduced tension and greater freedom of movement, in combination, reduces the resulting stress on the bridge members 60,62 during the bending and twisting of horn actuation and increases the useful life of the bridge members.

As shown, all the bridge members according to the present invention generally lie in the same plane as the first large conductive area 14a', 18a' and the second large conductive area 14b', 18b' although the bridge members could alternatively extend out of the plane. In addition, the bridge members could have paths forming sharp angles such as a "V" for example, although paths forming curved turns are preferred to reduce tension. It is also important to note that a bridge member can have a non-straight path generally in the form of a shape other than an omega, "S" or "Z".

It is believed that the many advantages of this invention will now be apparent to those skilled in the art and that a number of variations and modifications may be made therein without departing from its spirit and scope.

We claim:

1. An improved membrane horn switch for use in a driver side airbag module, the horn switch having first and second electrically conductive membrane sheets each having first and second relatively large areas connected by at least one relatively small bridge member, the at least one bridge member of each membrane sheet being readily rupturable by a force provided by an inflating airbag in the airbag module, the first and second relatively large areas of the second membrane sheet being superimposed and coextensive respectively with the first and second relatively large areas of the first membrane sheet with dielectric spacer means separating the first and second electrically conductive membrane sheets until sufficient actuation pressure is exerted on the membrane horn switch, the improvement comprising:

the at least one bridge member of each membrane sheet having a non-straight path between the first large area and the second large area of each membrane sheet.

2. The membrane horn switch of claim 1 wherein the at least one bridge member of each membrane sheet has at least one notch to lessen resistance of said bridge member to rupture by the force provided by the inflating airbag.

3. The membrane horn switch of claim 1 wherein the at least one bridge member of each membrane sheet has a serpentine path.

4. The membrane horn switch of claim 1 wherein the at least one bridge member of each membrane sheet has a serpentine path generally in the form of an omega.

5. The membrane horn switch of claim 1 wherein the at least one bridge member of each membrane sheet has a serpentine path generally in the form of an "S".

6. The membrane horn switch of claim 1 wherein the at least one bridge member of each membrane sheet has a serpentine path generally in the form of a "Z".

7. An improved membrane horn switch for use in a driver side airbag module, the horn switch having a first and a second electrically conductive membrane sheet each having first and second relatively large areas and at least one relatively small bridge member, the at least one bridge member having a first juncture with the first large area and a second juncture with the second large area, the at least one bridge member of each membrane sheet being readily rupturable by a force provided by an inflating airbag in the airbag module, the first and second relatively large areas of the second membrane sheet being superimposed and coextensive respectively with the first and second relatively large areas of the first membrane sheet with dielectric spacer means separating the first and second electrically conductive membrane sheets until sufficient actuation pressure is exerted on the membrane horn switch, the improvement comprising:

the at least one bridge member of each membrane sheet having an overall length between a central point of the first juncture of the bridge member and a central point of the second juncture of the bridge member that is at least greater than the length of an imaginary straight line between the central point of the first juncture of the bridge member and the central point of the second juncture of the bridge member.

8. The membrane horn switch of claim 7 wherein the at least one bridge member of each membrane sheet has at least one notch to lessen resistance of said bridge member to rupture by the force provided by the inflating airbag.

9. The membrane horn switch of claim 7 wherein the at least one bridge member of each membrane sheet has a serpentine path between the first juncture and the second juncture.

10. The membrane horn switch of claim 9 wherein the at least one bridge member of each membrane sheet has a path generally in the form of an omega between the first juncture and the second juncture.

11. The membrane horn switch of claim 9 wherein the at least one bridge member of each membrane sheet has a path generally in the form of an "S" between the first juncture and the second juncture.

12. The membrane horn switch of claim 9 wherein the at least one bridge member of each membrane sheet has a path generally in the form of a "Z" between the first juncture and the second juncture.

13. A membrane horn switch for use in a driver side airbag module, the membrane switch comprising:

first and second electrically conductive membrane sheets each having first and second relatively large areas connected by at least one relatively small bridge member readily rupturable by a force provided by an inflating airbag in the airbag module, the at least one bridge member having a non-straight path between the first relatively large area and the second relatively large area;

the first and second relatively large areas of the second membrane sheet being superimposed and coextensive respectively with the first and second relatively large areas of the first membrane sheet; and dielectric spacer means separating the first and the second electrically conductive membrane sheets until sufficient actuation pressure is exerted on the membrane horn switch.

14. The membrane horn switch of claim 13 wherein the at least one bridge member of each membrane sheet has at least one notch to lessen resistance of said bridge member to rupture by the force provided by the inflating airbag.

15. The membrane horn switch of claim 13 wherein the at least one bridge member of each membrane sheet has a serpentine path.

16. The membrane horn switch of claim 13 wherein the at least one bridge member of each membrane sheet has a serpentine path generally in the form of an omega.

17. The membrane horn switch of claim 13 wherein the at least one bridge member of each membrane sheet has a serpentine path generally in the form of an "S".

18. The membrane horn switch of claim 13 wherein the at least one bridge member of each membrane sheet has a serpentine path generally in the form of a "Z".

* * * * *